C. H. McCormick,
Harvester Cutter.

No. 2652
33656

Patented. Nov. 5, 1861

UNITED STATES PATENT OFFICE.

CYRUS H. McCORMICK, OF CHICAGO, ILLINOIS.

IMPROVEMENT IN THE CUTTING APPARATUS OF MOWING AND REAPING MACHINES.

Specification forming part of Letters Patent No. 33,656, dated November 5, 1861.

*To all whom it may concern:*

Be it known that I, CYRUS H. MCCORMICK, of Chicago, in the county of Cook and State of Illinois, have invented certain new and useful Improvements in the Cutting Apparatus of Machines for Mowing and Reaping, of which the following is a full, clear, and exact description, reference being had to the accompanying drawings, which make part of this specification, and in which—

Figure 1:
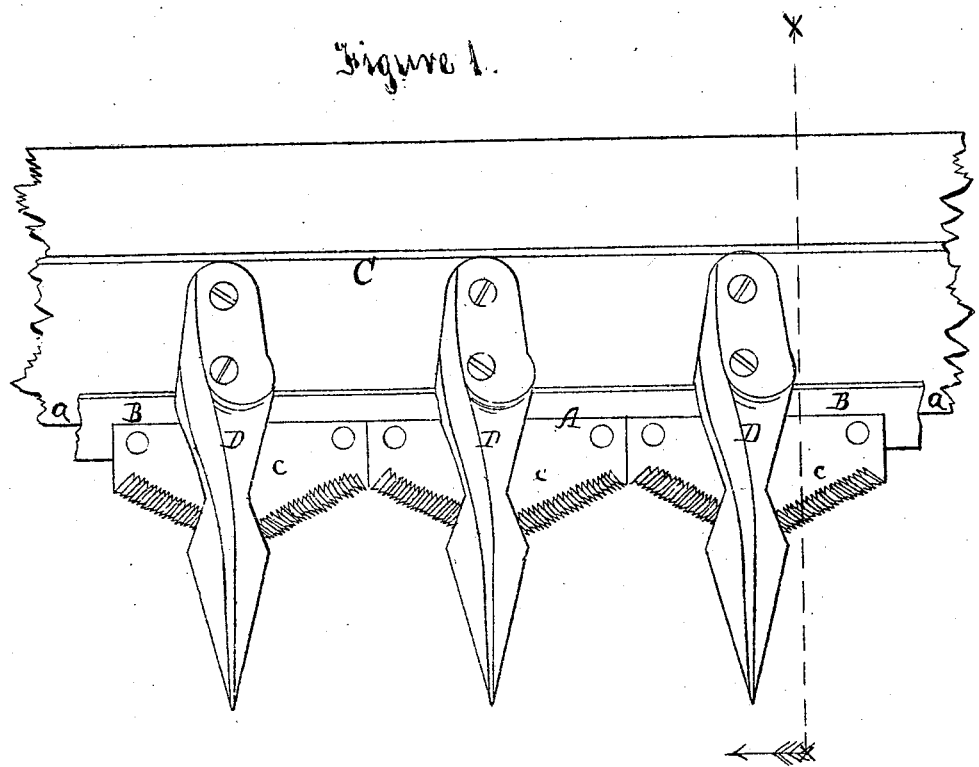
Figure 2:
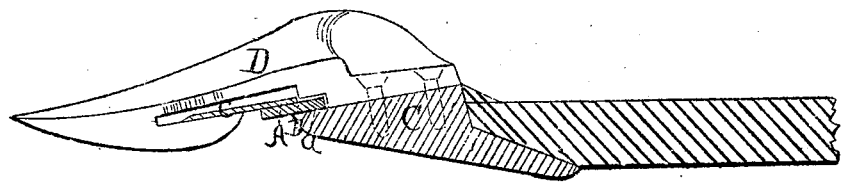

Figure 1 represents a plan of a McCormick cutting apparatus embracing my improvements, and Fig. 2 represents a transverse section of the same at line $x$ $x$ of Fig. 1.

The object of my invention is to diminish the width and thickness of the cutter without impairing its efficiency; and to this end I make the front margin of the top of the finger-beam the guide for the cutter, so that it may be firmly supported throughout its whole length, and I arrange the cutter-bar to slide upon this guide, and rivet the blade to the top of the bar; and to prevent the cutting-edge of the blade from being too high for mowing when thus supported upon its bar on top of the finger-bar I arrange the guide, cutter-bar, and blade so that the blade will droop enough to bring its edge down to or below the level of the top of the guide on the finger-beam. By thus supporting the blade by the cutter-bar and the latter in turn by the finger-beam and inclining the blade downward to prevent it from cutting too high I am enabled to employ a scalloped cutter narrower and lighter than would be admissible if it were made, supported, and arranged in the usual manner.

The scalloped cutter A is arranged to slide in a guide on the finger-beam. The bar B, to which the blades of the cutter are riveted, rests on the front margin of the top of the beam C, which forms the guide $a$ and support for the under side of the cutter.

The top and back guides for the cutter may be formed in the fingers D, as represented, or in brackets fastened to the finger-beam, or may consist of a rib on the top of the finger-beam in rear of the cutter-bar. The cutter requires a guide in front, only at each end, to steady it, as the forces tending to displace it act mainly, if not wholly, upward, downward, and backward.

The bar B and blades $c$ of the cutter may be made of the usual materials, but of less width and thickness, by at least ten per cent., than cutters of the same kind so made and arranged as to be supported at intervals and guided by the blade instead of the bar, as in my improved arrangement. This saving in material makes the cutter cost less, and the resulting diminution of its weight saves propelling power.

What I claim as my invention, and desire to secure by Letters Patent, is—

The combination of the drooping blade and its bar with the supporting-guide for the bar on the front margin of the finger-beam, all constructed and arranged substantially as described.

In testimony whereof I have hereunto subscribed my name.

C. H. McCORMICK.

Witnesses:
   F. W. WENTWORTH,
   WM. T. POOLE.